Inventor
BERTIE C. GOLDEN

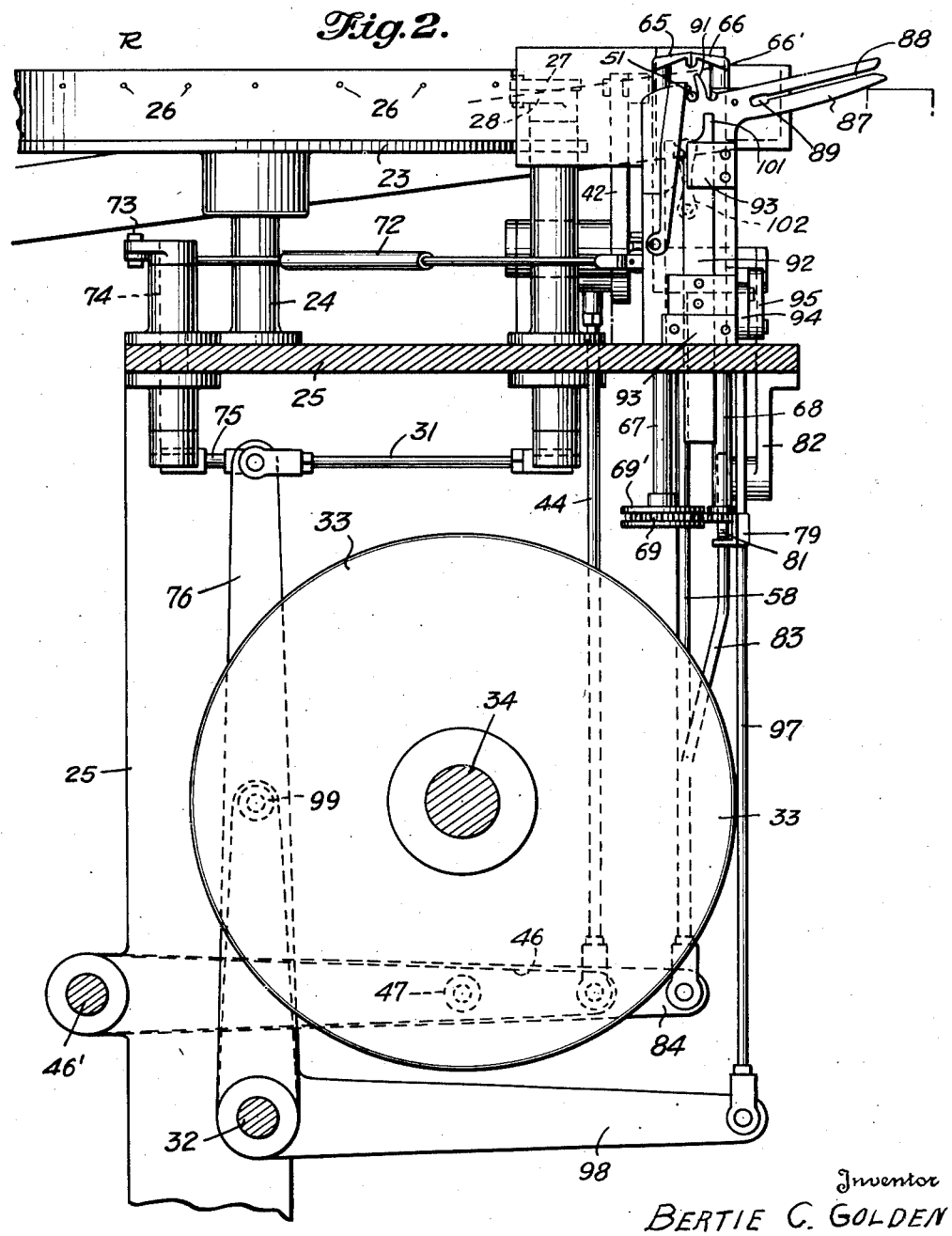

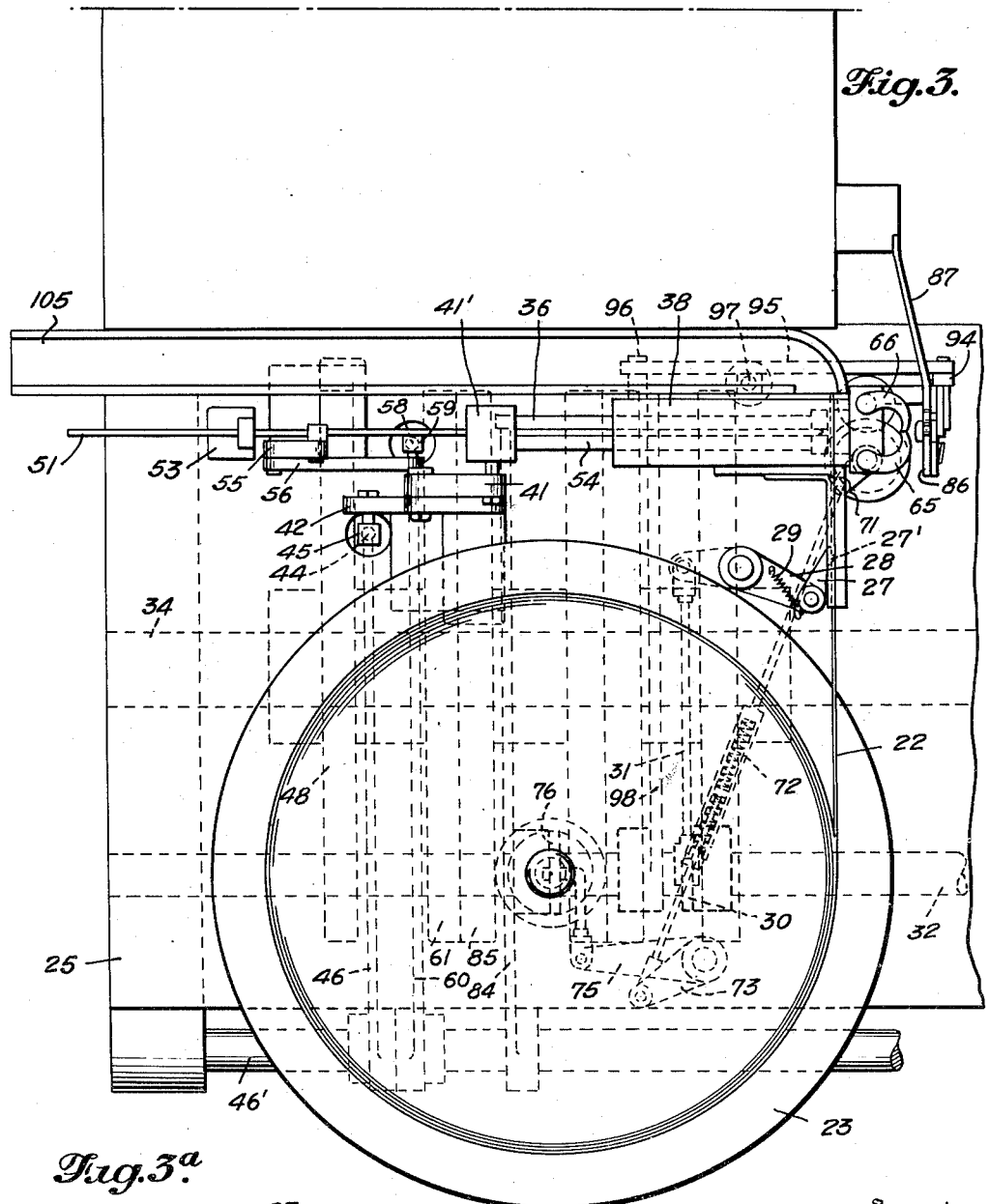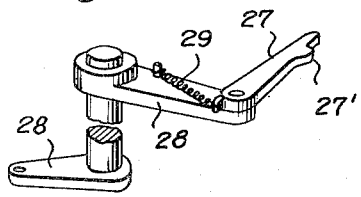

Inventor
BERTIE C. GOLDEN

July 1, 1952  B. C. GOLDEN  2,601,835
TAGGING MACHINE FOR TOBACCO BAGS AND THE LIKE
Filed April 21, 1948  8 Sheets-Sheet 5
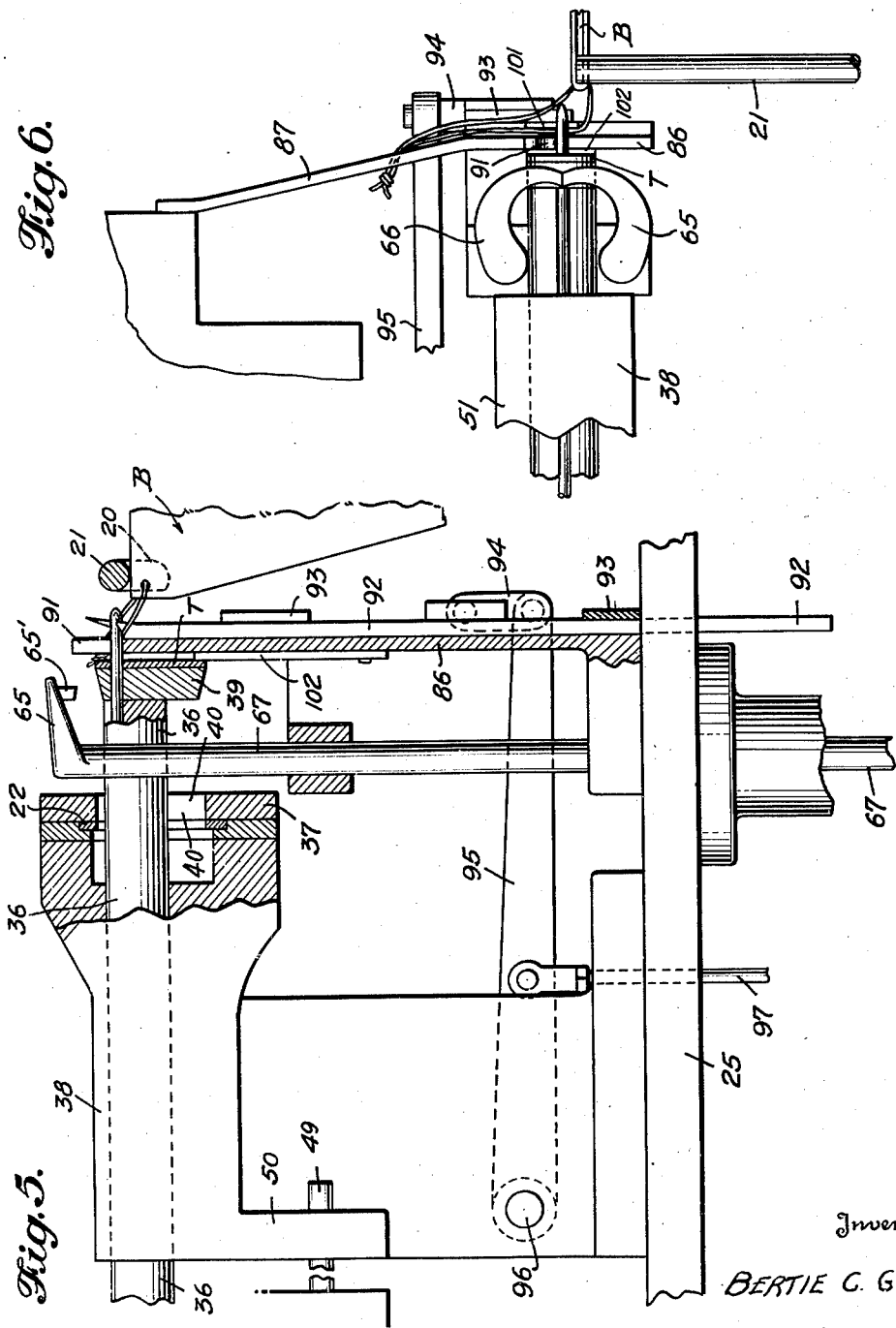
Inventor
BERTIE C. GOLDEN
By Munson Hare

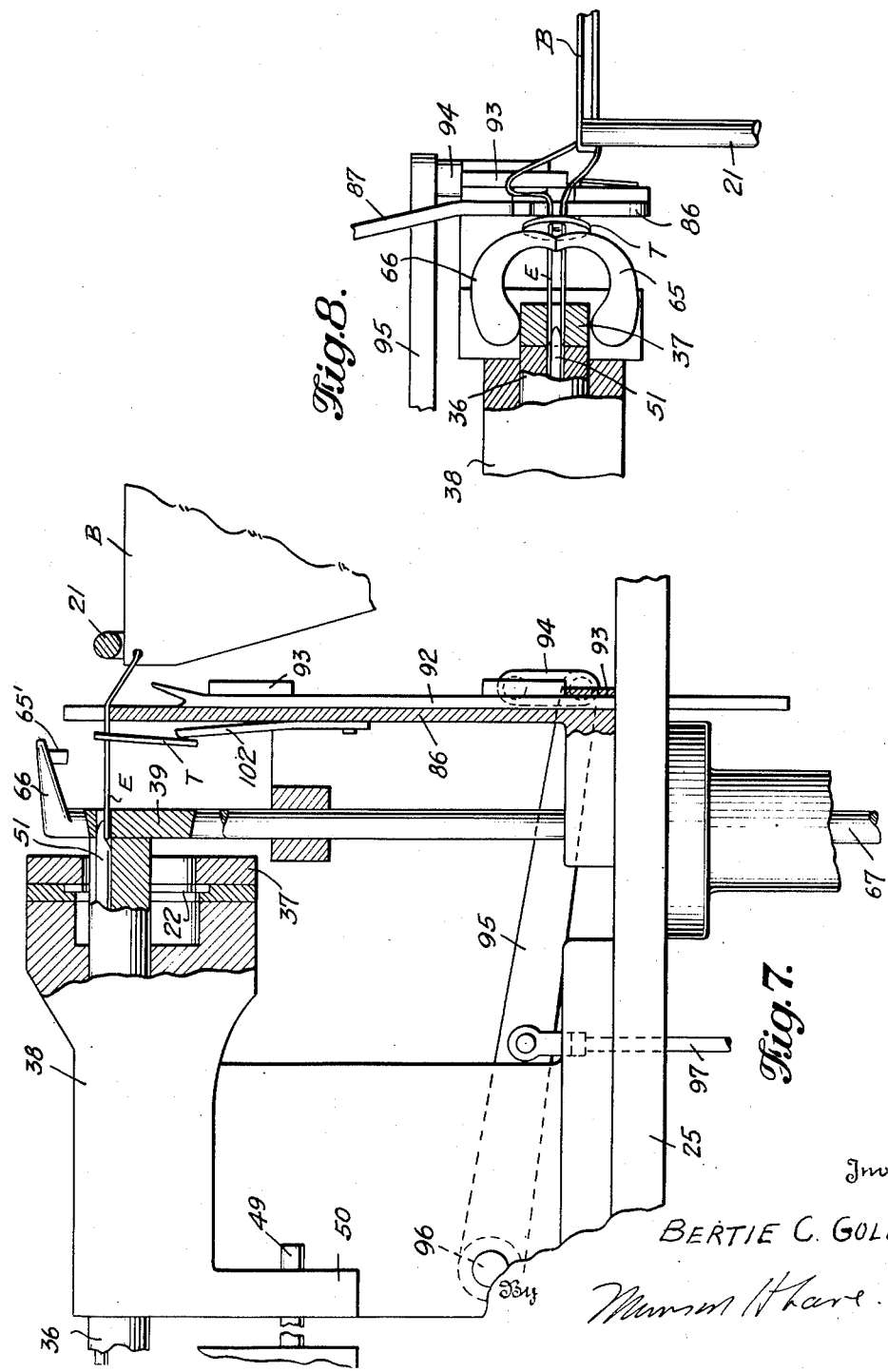

July 1, 1952  B. C. GOLDEN  2,601,835

TAGGING MACHINE FOR TOBACCO BAGS AND THE LIKE

Filed April 21, 1948  8 Sheets-Sheet 7

Inventor
BERTIE C. GOLDEN
By

July 1, 1952  B. C. GOLDEN  2,601,835
TAGGING MACHINE FOR TOBACCO BAGS AND THE LIKE
Filed April 21, 1948  8 Sheets-Sheet 8
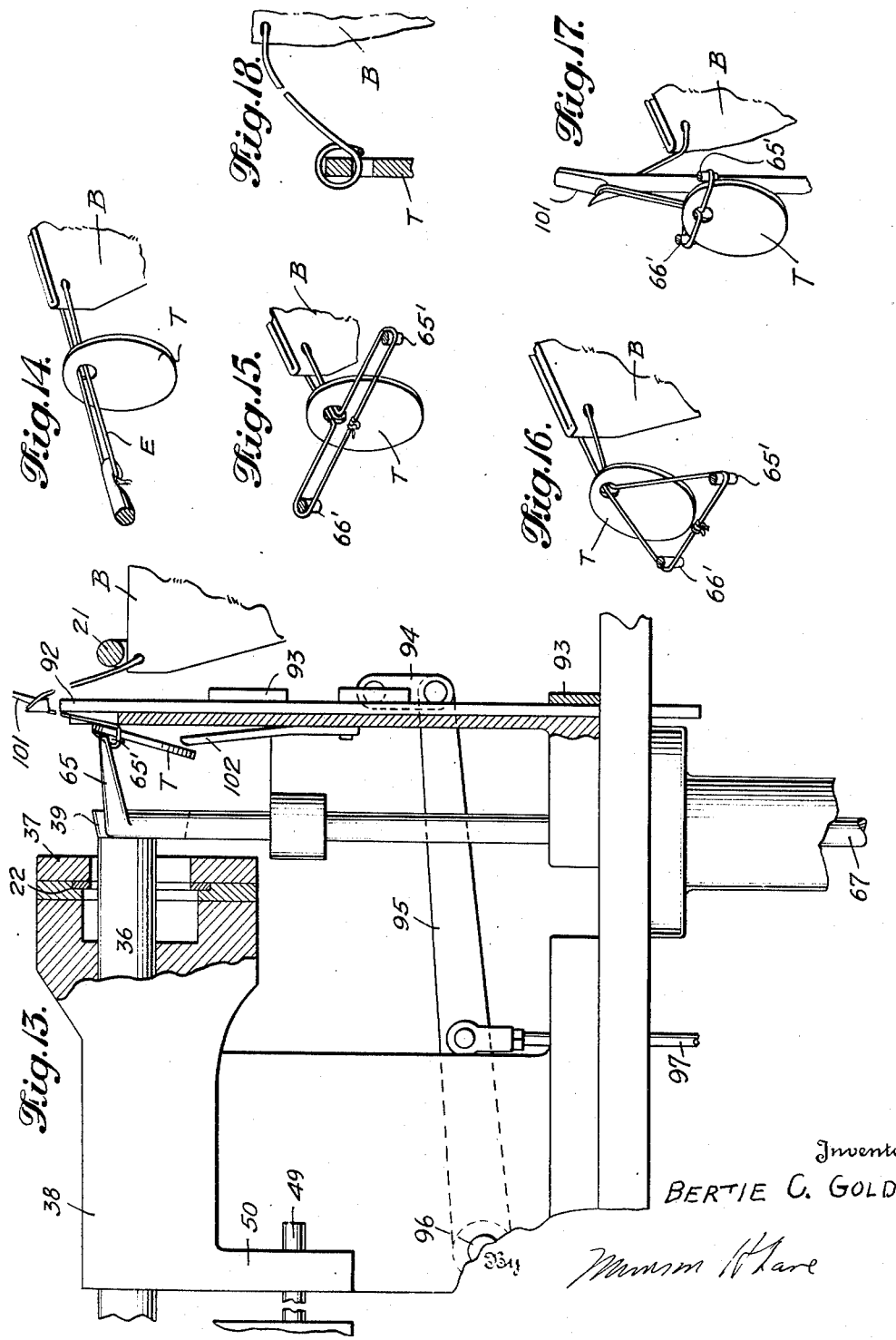
Inventor
BERTIE C. GOLDEN Patented July 1, 1952

2,601,835

UNITED STATES PATENT OFFICE 2,601,835

TAGGING MACHINE FOR TOBACCO BAGS AND THE LIKE

Bertie C. Golden, Richmond, Va., assignor to Millhiser Bag Company, Inc., Richmond, Va., a corporation of Virginia Application April 21, 1948, Serial No. 22,314

28 Claims. (Cl. 112—104)

This invention relates to machines for applying tags to the strings of bags of smoking tobacco, is an improvement over the machines of my Patent No. 2,304,908, dated December 15, 1942, and of my pending application Serial No. 662,753, filed April 17, 1946, now Patent No. 2,537,342, dated January 9, 1951. A machine embodying the present invention may be used to apply tags to either filled or empty bags and may be used as a separate mechanism or in connection with bag stringing machines such as are disclosed in my Patent No. 2,296,783, dated September 22, 1942, and in my pending applications Serial No. 515,164, filed December 21, 1943, now Patent No. 2,504,974, dated April 25, 1950, and Serial No. 792,793, filed December 19, 1947, now Patent No. 2,565,495, dated August 28, 1951. The tagging mechanism disclosed herein may also be adapted for use in connection with the delivery means of other types of bag stringing machines, or it may be employed in conjunction with the delivery means of bag filling machines of various types, or the bag to be tagged may be delivered and held in any suitable manner in proximity to the tagging mechanism.

In accordance with the method of the invention, a bag having a looped drawstring is brought to a tagging station where a perforated tag (preferably punched out from a strip) is held while the looped drawstring is first pulled through the perforation, then opened out and moved relative to the tag to bring the opened loop over the end of the tag, and thereafter is moved to tighten the loop knot. Hence the method of applying the tag is radically different from the method of my Patent No. 2,304,908 and of my application Serial No. 662,753, now Patent No. 2,537,342, in both of which the tag itself is turned and moved through a complex path to get it through the drawstring loop.

Objects of the invention are to make the tagging operation more certain when operating at relatively high speeds, also to make a tighter loop knot than is possible in the earlier machines, also to simplify the tagging mechanism. General objects are to provide a fully automatic tagging machine which is adaptable to a number of different situations, as stated above.

The invention will be more readily understood by reference to the accompanying drawings and the following detailed description in which an illustrative embodiment of the invention is set forth by way of example, it being understood that numerous modifications and variations may be resorted to without departing from the spirit of the invention.

In the accompanying drawings:

Fig. 2 is a sectional elevation, from the right side of Fig. 1, but showing the roll of strip for forming the tags in place;

Fig. 3 is a top plan view, showing the roll in outline, so as not to obscure parts underneath;

Fig. 3a is a detail in perspective;

Fig. 5 is a view like Fig. 4, but showing the tag immediately after being punched;

Fig. 6 is a top plan view of the parts in the positions of Fig. 5;

Fig. 7 is a view like Fig. 4, but showing the needle and die retracted and the drawstring pulled through the eye of the tag;

Fig. 8 is a top plan view of the parts in the positions of Fig. 7;

Fig. 13 is a view like Fig. 4 but showing the parts in a still later position;

Fig. 14 is a detail in perspective showing the needle after it has pulled the drawstring through the eye of the tag;

Fig. 15 is a detail in perspective showing the drawstring loop opened up by the string grippers;

Fig. 16 is a detail in perspective showing the drawstring loop still opened but pulled down by the string grippers, so that the tag may enter the loop;

Fig. 17 is a detail in perspective showing the tag nearly through the loop, due to the action of the string tightener; and Fig. 18 is a fragmentary view partly in section showing the tag secured by a loop knot to the bag.

Bag holding means

Figure 1:
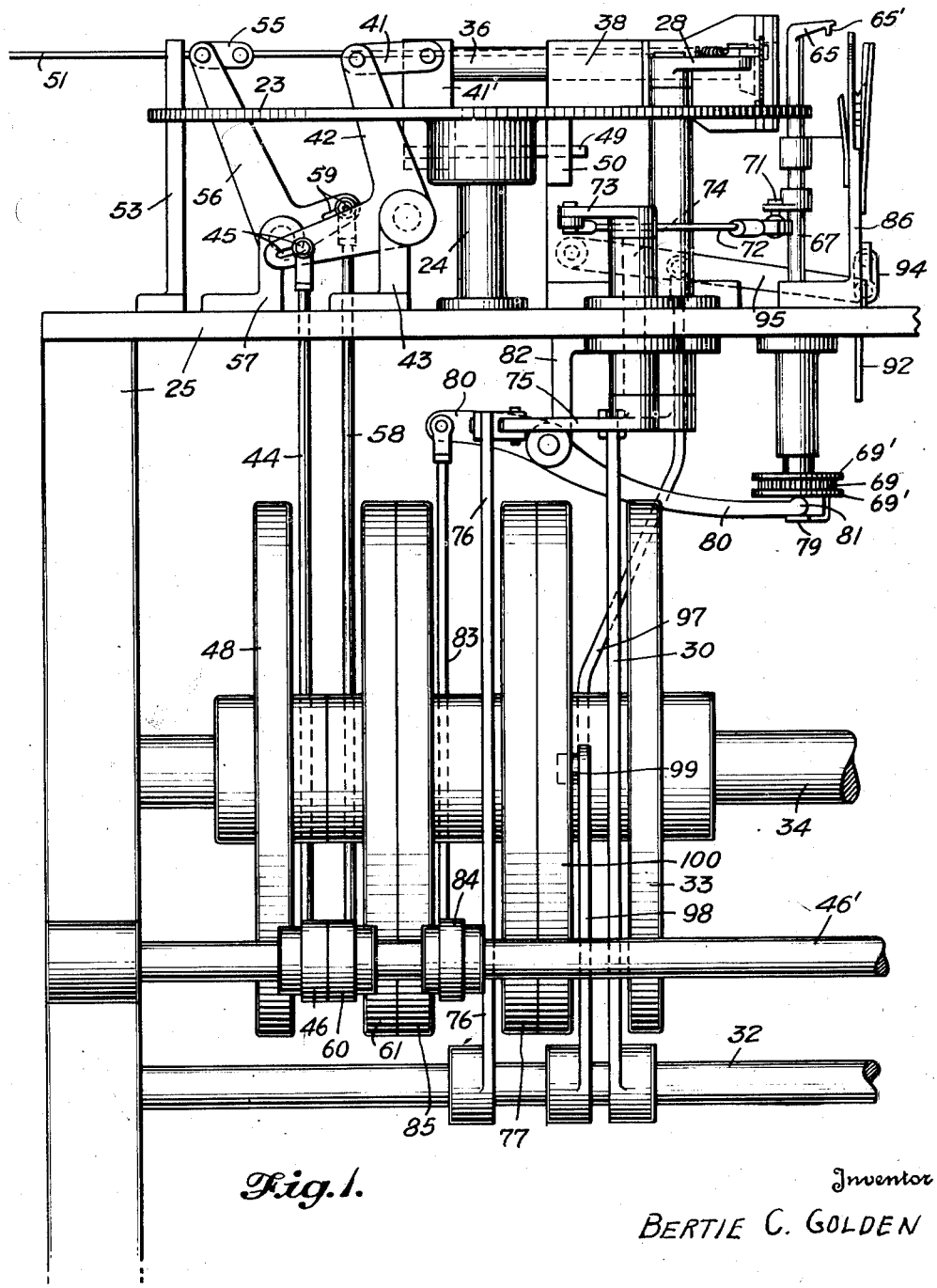
Fig. 1 is a partial side elevation of a machine embodying the invention.

Referring in detail to the drawings, B denotes a suitable bag, herein shown as a tobacco bag, provided with a pair of drawstrings whose looped and knotted ends E project beyond the bag. The present invention provides means for attaching a tag to one of those looped ends. Bag B may be supported in any suitable manner in operative relation to the tagging mechanism, but preferably the bag is suspended from a pair of holding members or grippers 20 carried by rods 21, which, like rods 11 of my Patent No. 2,304,908, may be slidably and rotatably mounted in bearings (not shown). After the tagging operation is completed the rods 21 are rotated so as to move the grippers 20 toward each other and thus release the bag, after which another bag is delivered to the tagging mechanism. Other forms of bag holding means may be employed.

*Tag forming and feeding mechanism*

In the present machine the tags are cut or punched from a continuous paper strip wound in a spiral or roll like the ticket strips commonly in use for fairs, shows, amusement concessions, etc. This paper strip is indicated at 22 while the spirally wound roll is designated R. It is preferably carried by a freely rotatable horizontal turntable 23 which is supported upon the upper end of a standard 24 fixed to the top of a horizontal portion of the machine frame 25. The paper strip 22 has eyes or perforations 26 punched out of it at regular intervals to facilitate attachment of the tags to the bags, it being understood that each tag when cut or punched from the strip has one of these eyes or perforations. As each tag is punched by the mechanism to be described, another tag takes its place because of a tag-feeding mechanism shown in Figs. 3, 3a and 1. The turntable 23 rotates in response to the pull of the strip 22 as this feeding takes place.

The tag-feeding mechanism preferably consists of a finger 27 having a dog 27' adapted to engage each eye or perforation 26 to push the strip 22 toward the needle mechanism where the actual tagging takes place; said finger being pivotally mounted on one arm of a bell crank lever 28. A tension coil spring 29, secured at one end to lever 28 and at the other end to a projection on finger 27, causes said finger to press against one face of strip 22, so that the dog 27' enters each eye. The bell crank lever is swung by means of a cam lever 30 whose upper end is pivotally connected with an arm 31 (best shown in Fig. 2), while the other end of arm 31 is pivotally connected with the bell crank lever 28. Cam lever 30 at its lower end is rockable on a cross rod 32 fixed to the machine frame. A cam follower (not shown) is carried on lever 30 and engages a cam slot (not shown) in a cam disk 33 secured to a power driven shaft 34. Shaft 34 may be considered the main drive shaft of the machine. As the cam disk 33 rotates, lever 30 will be oscillated through a small arc to cause the finger 27 alternately to move forward or toward the needle mechanism (with its dog 27 engaged with an eye) and backward until the dog enters the next eye of the strip, responsive to the spring 29.

The forward end of the tag strip 22 is fed to throat 35 between a pair of cooperating die members, viz., a die plunger 36 and a stationary die head 37. (See Fig. 4). The die plunger is also partially shown in Figs. 1 and 3 and is clearly seen to be a reciprocable plunger slidable in a guide or bearing 38 fixed to the machine frame. A die 39 on the forward end of the die plunger has a shearing fit in a passage 40 provided in the die head 37, so that the tag strip is sheared or punched by the forward movement of die 39 into said passage. To effect reciprocation of the die plunger a link 41 is pivotally connected to a block 41' fixed to the die plunger 36 and has its other end pivoted to a bell crank lever 42 which in turn is pivoted to a bracket 43 fixed to the machine frame. A lever 44 is coupled by a pin-and-slot connection 45 with bell crank lever 42 and extends downwardly to a pivotal connection with the free end of a pivoted arm 46 swingable on a cross-rod 46'. Arm 46 carries a cam follower 47 (Fig. 2) which travels in a cam slot (not shown) in a cam disk 48 keyed to the main shaft 34. Thus, upon rotation of the main shaft the die plunger 36 is moved back and forth to cut off or punch tags from the strip, the arrangement being such that every such punched-out tag T has a perforation or eye 26, as previously mentioned. The better to guide the die plunger a guide rod 49 is rigidly secured to block 41' and extends parallel to the die plunger, being reciprocable in a bore in a depending ear 50 integral with the bearing 38.

*Drawstring threading mechanism*

Figure 4:
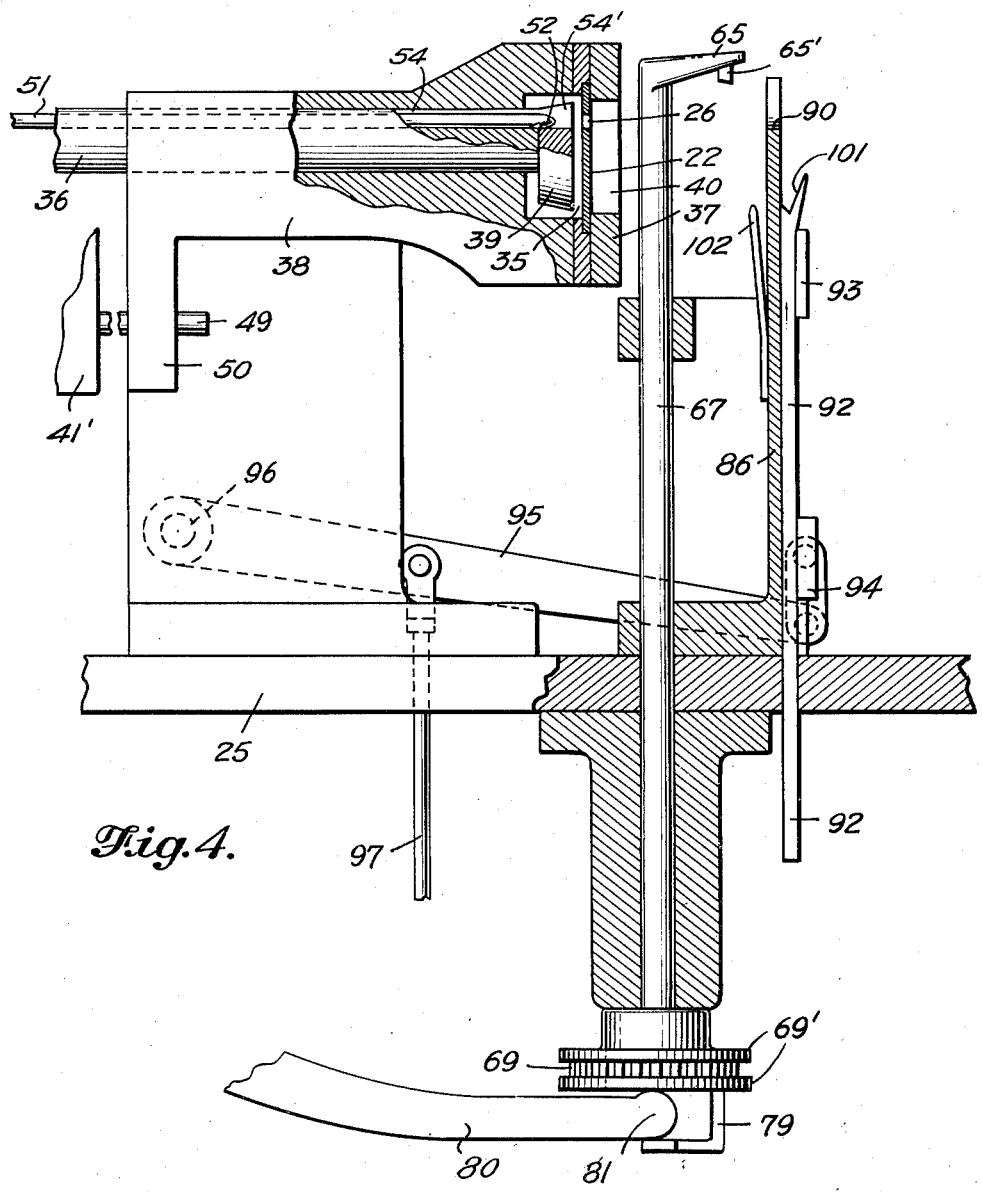
Fig. 4 is a fragmentary sectional elevation on a larger scale, showing the positions of the parts just before the tag is punched from the strip.
Figure 9:
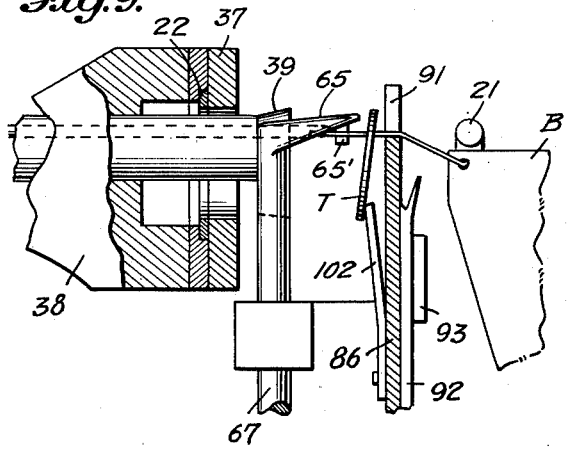
Fig. 9 is a detail in sectional elevation, showing the next position.

To move the string end E through the eye of the tag, a needle mechanism is used. The needle mechanism includes a reciprocating needle, means to support and guide it and means to operate it. The needle 51 is a long, thin metal rod having a hook 52 (Fig. 4) at its forward or operating end, said hook being adapted to catch the drawstring, as will be described. As shown in Figs. 1 and 3, the needle is supported and guided by a bearing bracket 53 fixed to the machine frame and also by the die plunger itself, which has a narrow groove 54 in its upper part to slidably receive the needle. The die 39 has a complemental groove 54', as shown in Fig. 4. To reciprocate the needle, a link 55 is pivotally connected with the needle and with a bell-crank-lever 56 pivoted on a bracket 57 mounted on the machine frame. A lever 58 is coupled by a pin-and-slot connection 59 with bell crank lever 56 and extends down to a pivotal connection with the extremity of an arm 60 pivoted on cross rod 46'. On arm 60 is a cam follower (not shown) which moves in a cam groove (not shown) in a cam disk 61 fixed to the main shaft 34. Thus the drive shaft causes the needle to reciprocate on the die plunger but independently thereof, to perform functions to be described.

*Loop spreading and positioning means*

Figure 12:
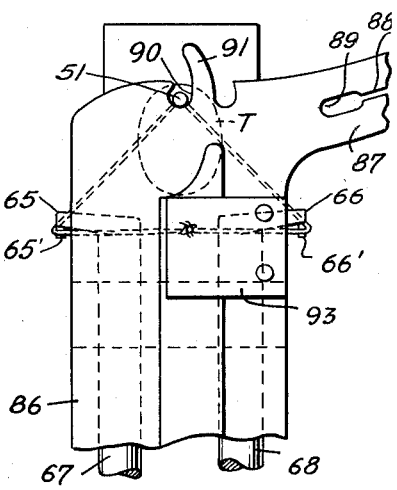
Fig. 12 is a front elevation of the parts about in the positions of Fig. 11, but showing a somewhat more advanced condition of the string loop.
Figure 10:
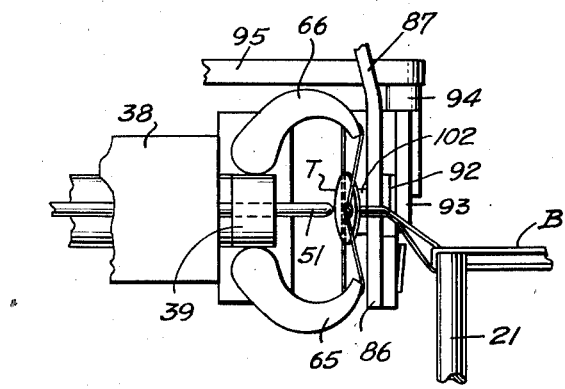
Fig. 10 is a top plan view of the parts in the positions of Fig. 9.

To spread the drawstring loop so that the tag T can move through it, a pair of oscillating and reciprocating string grippers are employed. One or both of these grippers are shown in each of Figs. 1 to 3 and 4 to 13, inclusive, while their operation is partly shown in Figs. 15, 16 and 17. The grippers consist of a pair of complementary curved fingers 65, 66 having downwardly extending hook members 65', 66' respectively to engage the loop of the drawstring. The fingers 65, 66 are integral with rods or shafts 67, 68 respectively which are parallel and are located close to passage 40 in die head 37 but spaced apart far enough to permit the die plunger, including die 39 and the tag punched out thereby, to pass between them, as will be understood from Fig. 5. One of these shafts 67 carries a gear 69 at its lower end while the other shaft 68 carries a gear (not herein visible) of the same size and meshing with gear 69, so that any oscillation of shaft 67 will effect a like degree of oscillation of shaft 68, but in the opposite direction. Thus fingers 65, 66 may be swung simultaneously from the closed or contacting position shown in Figs. 2, 3 and 6 to the loop-spreading position shown in Figs. 10 and 12. Oscillation of shaft 67 is effected through an arm 71 to which a resilient link 72 is pivotally connected, the other end of the resilient link being pivotally connected to an arm 73 on the upper end of a rockshaft 74 journaled in bearings on the frame. At its lower end, rockshaft 74 carries an arm 75 to which a cam lever 76 is pivoted. Cam lever 76 has its lower end pivotally mounted on cross rod 32. A cam follower (not shown) is carried by cam lever 76 and travels in a cam groove (not shown) in a cam disk 77 which is secured to the main drive shaft 34. Thus rotation of said shaft causes the gripper fingers 65, 66 to swing in a horizontal plane toward and from each other, or in other words, to open and close.

For the proper functioning of the grippers, the shafts 67, 68 must move up and down simultaneously, without interference with the opening and closing just described. Hence arm 71 must have a splined or similar connection with shaft 67. At its lower end shaft 68 carries a socket member 79. A lever 80 has a ball end 81 fitting in said socket member and is pivoted intermediate its ends on a bracket 82 fixed to the frame, while its other end is pivoted to the upper end of a link 83. The link 83 at its lower end is pivotally connected to an arm or lever 84 pivoted on the cross rod 46'. A cam follower (not shown) is mounted on lever 84 and travels in a cam groove (not shown) in a cam disk 85 driven by the main drive shaft. When said shaft is operated, the ball end 81 of lever 80 moves up and down to cause shaft 68 to move likewise, and shaft 67 moves with it because gear 69 has flanges 69' partially embracing gear 70 (Fig. 2).

Drawstring supporting and tightening mechanism

To assist in the threading operation and in tightening the drawstring after the tag has been moved through the loop, a string supporting and tightening mechanism is provided. Referring first to Figs. 1 and 4, a vertical plate 86 is fixed to the machine frame and has a drawstring guide and support 87 (Figs. 2, 6 and 12) integral therewith and extending outwardly laterally, said guide and support having a slot 88 for the drawstring, said slot ending in an enlargement or eye 89. As the bags are brought by rods 21 to the tagging mechanism one of the drawstrings enters slot 88 and moves along said slot until it reaches eye 89, when further movement ceases. An aperture 90 for needle 51 is also provided in the upper end of plate 86, and as shown in Figs. 5 and 6, the needle in its forward movement passes through said aperture and catches one of the strands of the looped drawstring with its hook 52. An upwardly extending guide finger 91, integral with plate 86, aids in guiding the drawstring reciprocating during the knotting operation. A string tightener 92 is slidable up and down along the outer face of plate 86, being guided thereby and by a pair of keepers 93 which are screwed to plate 86. String tightener 92 projects through an opening in frame 25, thereby being additionally guided, and is pivotally connected with a link 94 whose other end is pivoted to an arm 95, in turn pivoted at the opposite extremity as at 96 to a bracket or other member fixed on the machine frame. At a point intermediate the ends of arm 95 a rod 97 is pivotally connected. Rod 97 is also pivotally connected to one arm of a bell crank lever 98 (Fig. 2) which rocks on cross rod 32. The other arm of said bell crank lever carries a cam follower 99 (Fig. 1) which travels in a cam groove (not shown) formed in a cam disk 100 fixed to the main shaft 34. Thus, as said shaft is rotated the string tightener moves from the position shown in Fig. 4 to that of Fig. 5, back to the position of Fig. 7, finally rising to the extreme position of Fig. 13 (cf. Fig. 17) before being restored to the initial position, Fig. 4. To catch and hold the drawstring, the string tightener has a deep notch 101 formed in its upper or string-engaging end.

Tag kick-out spring

Also secured on plate 86, but on the inside, is a kick-out spring 102 whose lower end only is secured, leaving the upper end (which normally is spaced from plate 86, as shown in Fig. 4) free to yield or move in against plate 86 when the die plunger is in its forward position, Fig. 5. This kick-out spring aids in holding the tag T in proper position during the tagging operation.

Operation

Figure 11:
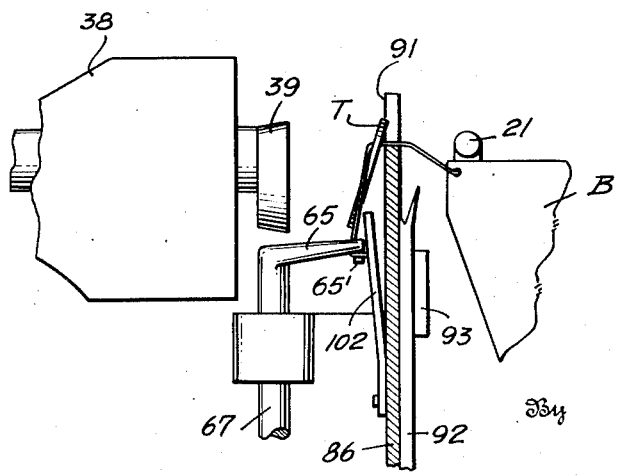
Fig. 11 is another detail like Fig. 9 but showing a later position of the parts.

At the start (assuming that the tag strip 22 has been fed through throat 35) the parts are in the relative positions of Fig. 4, with the needle 51 and the die plunger 36 both fully retracted. The bag B has been brought to the tagging station and its looped string end E has entered the slot 88 and moved down to the eye 89. First, the die plunger moves forward to punch the tag T from the strip, and simultaneously the needle moves forward, passing through the eye or aperture of the tag, the parts then assuming the positions shown in Figs. 5 and 6. In passing through the space between the fixed die member 37 and the vertical tag supporting plate 86 the tag is fed forwardly by the reciprocating plunger 36 and is guided in its passage by means of the needle 51. The tag is then firmly clamped between the die plunger and kick-out spring 102, which is bent back to lie flat against the vertical tag supporting wall or plate 86. It will be observed that the needle travels farther than the die plunger, passing through aperture 90 and presenting its hook 52 on the other side of plate 86. The string tightener 92 has risen to support the string by means of its notch 101. The needle is now hooked onto the string. As soon as this occurs the needle is retracted, pulling the string with it through the eye of the tag. The enlarged slot or eye 89 at the end of the slot 88 in the drawstring guide arm 87 extending from the tag supporting plate 86 permits the string to follow the needle. After the string has been pulled through, the die plunger also moves back, and the string tightener moves down, whereupon the parts are in the positions illustrated in Figs. 7 and 8. Here the tag is pendent from the string, which is still engaged with the hook of the needle. Next, the needle and die plunger move forward, but only part way to the plate 86, and simultaneously the grippers 65, 66 move down until their hook members 65', 66' engage the loop, whereupon the grippers are rotated to spread their ends apart, which brings the parts to the positions shown in Figs. 9 and 10. The string is thus taken off the hook of the needle. Forward movement of the die plunger occurs because it is desirable to support the needle at the instant transfer of the string to the grippers takes place. Now the grippers, still spread apart, are moved down to the positions illustrated in Figs. 11 and 12. The needle is fully retracted and the die plunger may be. The string is now under some tension and its gripped portion assumes a triangular shape, Fig. 12, with a width or lateral dimension much greater than the corresponding dimension of the tag. As Fig. 11 shows, the kickout spring has moved the lower end of the tag through the loop. See also Fig. 16. Next the string tightener 92 rises to engage the string and it continues to rise with the grippers still holding the loop, Fig. 13. But the grippers move in or approach each other with continued rise of the string tightener (Fig. 17) until finally the grippers come in contact and release the string at the moment the string tightener attains its highest position. Thus the loop knot is tightened by the co-action of the grippers and string tightener. See Fig. 18. The final position sees the needle and die plunger fully retracted, as in Fig. 4, and the tag strip feed then pushes another portion of the strip into throat 35. The punched portion of the strip goes out of the machine through a chute 105 (Fig. 3).

The various parts of the mechanism have been described in detail for the purpose of illustration but it will be obvious that many variations and modifications may be resorted to without departing from the spirit of the invention. Thus, while a tag strip feed and tag-forming die members have been described, the tags could be supplied to the machine completely formed, including their perforations. Furthermore, while an empty bag is illustrated in the drawings, it is contemplated that the invention may be applied to the tagging of filled bags. It will also be obvious that various mechanical means for actuating the principal parts of the machine in timed relation to one another may be substituted for the cam actuated mechanisms disclosed in the present application by way of illustration.

What I claim is:

1. In a tagging machine for tobacco bags and the like, means for supporting a bag with a looped string, means for delivering a perforated tag into proximity to said loop, means for pulling the loop through said perforation, means for separating the strands of that part of the loop which has been pulled through the perforation and moving the separated strands to the end of the tag remote from the perforation, means for moving the tag slightly so that part of it extends through the separated strands, and means for moving the strands and pulling the strands together to close the loop knot and thereby secure the tag to the bag.

2. A tagging machine for applying perforated tags to tobacco bags having looped strings, consisting of means for threading one of the looped strings through the perforation of a tag, means for holding the tag while it is being threaded and then releasing it, means for separating the strands of the loop beyond the perforation and moving the loop to an end of the tag, means for moving said end of the tag slightly so that it enters between the separated strands, and means for moving and pulling the strands together while the tag is stationary to close the loop knot and thereby secure the tag to the bag.

3. A machine for applying perforated tags to looped strings of tobacco bags and the like, comprising, in combination, tag-supporting means, means for supporting a bag and a string in proximity to tagging mechanism, said tagging mechanism including a reciprocating needle having means for moving the same through a perforation of a tag into proximity to the string, means movable into a position to support the string, said needle having means adapted to catch the string when so supported and then to pull the string through the perforation of the tag, gripper means adapted to engage on the inside that part of the loop which has been pulled through the perforation and spread said loop apart until its opening is greater than the width of the tag, means adapted to aid in moving the end of the tag through said spread-apart loop, said string-supporting means being adapted to move the string to close the loop knot thereby to secure the tag to the bag.

4. A machine for applying perforated tags to looped strings of tobacco bags and the like, comprising, in combination, tag strip feeding means, means to punch tags off the tag strip with a perforation in each tag so punched, means to support the punched tag, means for supporting a bag and a string in proximity to tagging mechanism, said tagging mechanism including a reciprocating needle movable through the perforation of the supported tag, said needle being adapted to catch the string and pull it through the perforation, means to spread apart that portion of the string loop which has been pulled through the tag, means to move the end of the tag through the spread-apart loop, and means adapted to move the string to close the loop knot thereby to secure the tag to the bag.

5. A machine for applying perforated tags to looped strings of tobacco bags and the like, comprising in combination, tag strip feeding means, a die plunger cooperating with a die to punch tags off the tag strip with a perforation in each tag so punched, a fixed member against which the die plunger moves after the punching operation to clamp the tag, means for supporting a bag and a string in proximity to tagging mechanism, said tagging mechanism including a reciprocating needle movable through the perforation of the clamped tag, said needle having means on its end adapted to catch the string and pull it through the perforation, means to open the string loop after it has passed through the perforation, the tag being then released by the clamping means, means to move the end of the tag through the opened loop, and means adapted to move the string to close the loop knot thereby to secure the tag to the bag.

6. A machine for applying perforated tags to looped strings of tobacco bags and the like, comprising, in combination, tag strip feeding means, a die plunger and die cooperating to punch tags off the tag strip with a perforation in each tag so punched, means for supporting a bag and a string in proximity to tagging mechanism, said tagging mechanism including a reciprocating needle, the die plunger having a groove in which the needle reciprocates, means for supporting a punched tag with its perforation in alignment with the path of the needle, the needle having means on its end adapted to catch the string and pull it through the perforation, means to open the string loop after it has passed through the perforation, means to move the end of the tag through the spaced loop, and means adapted to move the string to close the loop knot thereby to secure the tag to the bag.

7. A machine for applying perforated tags to looped strings of tobacco bags and the like, comprising, in combination, a stationary member, a reciprocating die plunger and die, means to feed a tag strip to a throat located between the die plunger and die, the die plunger being adapted to cut a tag having a perforation near one end off from the tag strip and move it against the stationary member thereby to clamp the tag, a needle reciprocating on and guided by the die plunger, means for supporting a bag with one of its looped strings extended, the needle having a hook on its end adapted to catch the string, the needle moving through the perforation of the tag to engagement with the string and on its return pulling the string through the perforation, string gripper means adapted to open up the loop of that portion of the string which has been pulled through the perforation, a kick-out spring adapted to assist in moving the tag end through the opened-up loop after the tag has been released by the clamping die plunger, and string tightener means engaging that portion of the string which has not been pulled through the perforation and cooperating with the string gripper means to move the opened-up loop over the entire length of the tag and to close the loop knot between the perforation and the adjacent end of the tag.

8. A machine for applying perforated tags to looped strings of tobacco bags and the like, comprising, in combination, a stationary member, a kick-off spring attached to the stationary member, means for supporting and holding a bag with one of its looped strings extended adjacent the stationary member, a reciprocating die plunger and a stationary die through which the die plunger passes, means to feed a tag strip to a throat located between the die plunger and die, the die plunger being adapted to cut a tag having a perforation off from the tag strip and move it against the kick-off spring and clamp it against the spring, the spring then yielding to the pressure and lying flat against the stationary member, a needle mounted to reciprocate through the clamped tag and also through an aperture in the stationary member, said needle having a hook on its end adapted to catch the extended string and pull it through the tag, a pair of oscillatory and reciprocatory fingers having means adapted to engage the inside of the looped string that has been pulled through the tag and spread the strands apart and move it down relative to the tag, the die plunger releasing the tag, the kick-out spring moving the tag (now supported pendently on the spring) away from the stationary member and part way through the spread-apart loop, a string-tightener reciprocable on the stationary member and adapted to engage the portion of the string extending between the held bag and the stationary member and to cooperate with the oscillatory fingers to move the loop over the tag and to close the loop knot.

9. A machine for applying perforated tags to looped strings of tobacco bags and the like, comprising, in combination, a stationary member, means for supporting a bag with one of its looped strings extended adjacent the stationary member, a reciprocating die plunger and a stationary die through which the die plunger passes, tag strip feeding means adapted to move a tag strip between the die and the die plunger, the die plunger being adapted to cut a tag having a perforation near one end off from the tag strip and move it against the stationary member and clamp it thereagainst, a needle mounted to reciprocate through the perforation of the clamped tag and also through an aperture in the stationary member, said needle having a hook on its end adapted to catch the extended string and pull it through the tag, a reciprocable string supporting and tightening means on the stationary member adapted to aid the needle to catch the string with its hook, oscillatory and reciprocating means to engage the loop of the string which has been pulled through the tag and open up said loop and move it down over the free end of the tag, the reciprocable string supporting and tightening means moving to engage the portion of the string lying between the bag and the stationary member and cooperating with the aforesaid oscillatory and reciprocating means to move the loop over the tag and to close the loop knot.

10. A machine for applying perforated tags to looped strings of tobacco bags and the like, comprising, in combination, an upright stationary member, a kick-off spring attached at its lower end to the stationary member and having its upper end free and normally spaced therefrom, means for supporting a bag with one of its looped strings extended adjacent the stationary member, a stationary die member, a reciprocating die plunger which passes through the die member, means to feed a tag strip between the die members, the die plunger in its forward movement cutting a perforated tag off the tag strip and moving it against the stationary member and the upper end of the kick-off spring and clamping it against the spring, a needle reciprocable in a groove provided in the die plunger, said needle having a hook end and being adapted to reciprocate independently of the die plunger and movable through an aperture in the stationary member and through the perforation of the clamped tag, a string-supporting and tightening member reciprocable up and down on the stationary member and adapted to move up to support the string as the needle end approaches it to hook onto it, the needle being adapted to pull the looped string with it through the perforation of the tag, a pair of oscillatory and reciprocating fingers having hook means to engage the loop on the inside to take the string off the hook end of the needle and then spread the loop strands apart and move the loop down over the lower end of the tag, the lower tag end projecting from the stationary member because of the kick-out spring which has been released by the die plunger, the string-supporting and tightening member then engaging that portion of the string which extends between the held bag and the stationary member and moving that string portion upwardly, the fingers simultaneously rising and closing toward each other and finally releasing the string at the extreme upper end of the tag.

11. In a machine for forming and applying tags to a bag having a looped drawstring, means for supporting a bag in tagging position, tag supporting means comprising a vertical wall member, means including a movable die member for forming a tag from a strip and feeding the formed tag against said wall, and means for engaging a portion of said looped drawstring and threading an end thereof through the tag while clamped by said die member against said wall member.

12. In a machine for forming and applying tags to a bag having a looped drawstring, means for supporting a bag in tagging position, tag supporting means comprising a vertical wall member, means including a movable die member for forming a tag from a strip and feeding the formed tag against said wall, means for engaging a portion of said looped drawstring and threading an end thereof through the tag while clamped by said die member against said wall member, means for separating the strands of that part of the loop which has been threaded through the tag and moving the opened loop over the end of the tag, and means for tightening the loop.

13. In a machine for forming and applying tags to a bag having a looped drawstring, means for supporting a bag in tagging position, tag supporting means comprising a vertical wall member, means including a movable die member for forming a tag from a strip and feeding the formed tag against said wall, means for engaging a portion of said looped drawstring and threading an end thereof through the tag while clamped by said die member against said wall member, means for opening the loop to permit the tag to pass therethrough, and means including a "kick-out" spring member carried by said wall member for moving a portion of said tag toward the open loop, and means for tightening the loop about the tag.

14. In a machine for forming and applying tags to a bag having a looped drawstring, means for supporting a bag in tagging position, tag supporting means comprising a vertical wall member, means including a reciprocable die member for forming a tag from a strip and feeding it against said wall, and means including a reciprocable needle passing through said die member and movable relative thereto for engaging a portion of said looped drawstring and threading an end thereof through the tag while clamped by said die member against said wall member.

15. A machine as set forth in claim 11 wherein the vertical wall member is provided with a thread guiding arm.

16. A machine as set forth in claim 11 wherein reciprocating thread positioning means are provided intermediate the tag supporting wall and the supported bag.

17. A machine as set forth in claim 14 wherein the needle supports the tag after the same is formed and prior to being clamped against the wall.

18. In a machine for forming and applying tags to a bag having a looped drawstring, means for supporting a bag in tagging position, tag supporting means comprising a vertical wall member, means including a movable member for forming a tag from a strip and clamping it against said wall, means for engaging a portion of said looped drawstring and threading an end thereof through the tag while clamped by said die member against said wall member, and means for opening the loop portion which has been threaded through the tag and moving the spread portion over the end of the tag, said means comprising a pair of oppositely swinging hook members and means for reciprocating said swinging members.

19. A machine as set forth in claim 18 wherein a reciprocating thread tightening member is provided intermediate the tag supporting wall and the supported bag.

20. In a mechanism for applying a tag to a bag having a drawstring, a fixed upright wall adapted to serve as a tag supporting abutment, tag supply means at one side of the wall, means for supplying successive bags having looped drawstrings to a tagging position at the other side of the wall, means on the tag supply side of the wall for intermittently clamping an individual tag against the wall, and means for threading through the tag while clamped against one side of the wall, the drawstring of a bag supported on the other side of the wall.

21. In a mechanism for applying a tag to a bag having a drawstring, a fixed upright wall adapted to serve as a tag supporting abutment, tag supply means at one side of the wall, means for supplying successive bags having looped drawstrings to a tagging position at the other side of the wall, means on the tag supply side of the wall for intermittently clamping an individual tag against the wall, means for threading through the tag while clamped against one side of the wall, the drawstring of a bag supported on the other side of the wall, and means on the tag side of the wall for moving the tag from the wall when the clamping means is released.

22. In a mechanism for applying a tag to a bag having a drawstring, a fixed upright wall adapted to serve as a tag supporting abutment, tag supply means at one side of the wall, means for supplying successive bags having looped drawstrings to a tagging position at the other side of the wall, means on the tag supply side of the wall for intermittently clamping an individual tag against the wall, means for threading through the tag while clamped against one side of the wall, the drawstring of a bag supported on the other side of the wall, and means on the tag side of the wall for moving the tag from the wall when the clamping means is released, said means comprising a spring plate secured to the wall.

23. In a mechanism for applying a tag to a bag having a drawstring, a fixed upright wall adapted to serve as a tag supporting abutment, tag supply means at one side of the wall, means for supplying successive bags having looped drawstrings to a tagging position at the other side of the wall, means on the tag supply side of the wall for intermittently clamping an individual tag against the wall, means for threading through the tag while clamped against one side of the wall, the drawstring of a bag supported on the other side of the wall, and means on the tag side of the wall for opening the loop of the drawstring after the same has been threaded through the tag.

24. In a mechanism for applying a tag to a bag having a drawstring, a fixed upright wall adapted to serve as a tag supporting abutment, tag supply means at one side of the wall, means for supplying successive bags having looped drawstrings to a tagging position at the other side of the wall, means on the tag supply side of the wall for intermittently clamping an individual tag against the wall, means for threading through the tag while clamped against one side of the wall, the drawstring of a bag supported on the other side of the wall, means on the tag side of the wall for opening the loop of the drawstring after the same has been threaded through the tag, and means for relatively moving the loop and tag to secure the tag to the drawstring.

25. In a mechanism for applying a tag to a bag having a drawstring, a fixed upright wall adapted to serve as a tag supporting abutment, tag supply means at one side of the wall, means for supplying successive bags having looped drawstrings to a tagging position at the other side of the wall, means on the tag supply side of the wall for intermittently clamping an individual tag against the wall, and means for threading through the tag while clamped against one side of the wall, the drawstring of a bag supported on the other side of the wall, said vertical wall including a drawstring guide arm.

26. In a mechanism for applying a tag to a bag having a drawstring, a fixed upright wall adapted to serve as a tag supporting abutment, tag supply means at one side of the wall, means for supplying successive bags having looped drawstrings to a tagging position at the other side of the wall, means on the tag supply side of the wall for intermittently clamping an individual tag against the wall, and means for threading through the tag while clamped against one side of the wall, the drawstring of a bag supported on the other side of the wall, said wall being cut away at its upper portion to permit passage of the drawstring threading means.

27. In a mechanism for applying a tag to a bag having a drawstring, a fixed upright wall adapted to serve as a tag supporting abutment, tag supply means at one side of the wall, means for supplying successive bags having looped drawstrings to a tagging position at the other side of the wall, means on the tag supply side of the wall for intermittently clamping an individual tag against the wall, means for threading through the tag while clamped against one side of the wall, the drawstring of a bag supported on the other side of the wall, said wall being cut away at its upper portion to permit passage of the drawstring threading means, and an upwardly extending guide finger adjacent the cut away portion.

28. In a mechanism for applying a tag to a bag having a drawstring, a fixed upright wall adapted to serve as a tag supporting abutment, tag supply means at one side of the wall, means for supplying successive bags having looped drawstrings to a tagging position at the other side of the wall, means on the tag supply side of the wall for intermittently clamping an individual tag against the wall, means for threading through the tag while clamped against one side of the wall, the drawstring of a bag supported on the other side of the wall, and reciprocating drawstring positioning and tightening means located at the bag side of the wall.

BERTIE C. GOLDEN.

REFERENCES CITED

The following references are of record in the file of this patent:

UNITED STATES PATENTS

| Number | Name | Date |
| --- | --- | --- |
| 2,304,908 | Golden | Dec. 15, 1942 |